(12) United States Patent
Duffner et al.

(10) Patent No.: US 10,974,428 B2
(45) Date of Patent: Apr. 13, 2021

(54) MOLD CLOSING UNIT FOR AN INJECTION MOLDING MACHINE

(71) Applicant: ARBURG GMBH + CO KG, Lossburg (DE)

(72) Inventors: Eberhard Duffner, Starzach (DE); Rainer Bletscher, Baiersbronn (DE)

(73) Assignee: ARBURG GMBH + CO KG, Lossburg (DE)

( * ) Notice: Subject to any disclaimer, the term of this patent is extended or adjusted under 35 U.S.C. 154(b) by 0 days.

(21) Appl. No.: 16/636,726

(22) PCT Filed: Aug. 7, 2018

(86) PCT No.: PCT/EP2018/071338
§ 371 (c)(1),
(2) Date: Feb. 5, 2020

(87) PCT Pub. No.: WO2019/030203
PCT Pub. Date: Feb. 14, 2019

(65) Prior Publication Data
US 2020/0238584 A1  Jul. 30, 2020

(30) Foreign Application Priority Data
Aug. 7, 2017 (DE) ............ 10 2017 117 934.8

(51) Int. Cl.
*B29C 45/17* (2006.01)
*B29C 45/66* (2006.01)
*B29C 45/64* (2006.01)

(52) U.S. Cl.
CPC .......... *B29C 45/66* (2013.01); *B29C 45/1761* (2013.01); *B29C 2045/1763* (2013.01); *B29C 2045/648* (2013.01)

(58) Field of Classification Search
CPC ..... B29C 45/1761; B29C 45/66; B29C 45/80; B29C 2045/1763; B29C 2045/648;
(Continued)

(56) References Cited

U.S. PATENT DOCUMENTS 6,821,463 B2 * 11/2004 Di Dio .................. B29C 45/68
                                                        264/328.1
7,186,106 B2 *  3/2007 Kato ..................... B22D 17/26
                                                        425/169

(Continued)

FOREIGN PATENT DOCUMENTS

AT          006788 U1     3/2004
DE          4403079 C1    4/1995
                (Continued)

OTHER PUBLICATIONS

International Search Report for corresponding application PCT/EP2018/071338 filed Aug. 7, 2018; dated Nov. 15, 2018.

*Primary Examiner* — James P Mackey
(74) *Attorney, Agent, or Firm* — Cantor Colburn LLP

(57) ABSTRACT

A mold closing unit for an injection molding machine for processing plastics and other compounds that can be plasticized, including at least one machine bed, at least one stationary platen, and at least one platen that can be moved relative to the stationary platen by a drive mechanism, where the movable platen can be moved on a slide having guide shoes along at least one guide attached to the machine bed, and the drive mechanism has at least one gear rack drive driven by at least one drive motor, whereby, because at least two gear racks are fixedly connected to the machine bed and because the drive motor is fixedly connected to the slide and, in the event of a movement of the movable platen, the occurrence of tilting torques are reduced and safe operation of the mold closing unit is ensured.

13 Claims, 8 Drawing Sheets

(58) Field of Classification Search
CPC .... B29C 2045/664; B29C 2945/76013; B29C 2945/76224; B29C 2945/76387; B29C 2945/76709; B29C 2945/76866; B30B 15/007

See application file for complete search history.

(56) References Cited

U.S. PATENT DOCUMENTS

| | | | |
|---|---|---|---|
| 7,429,169 B2* | 9/2008 | Tsuji | B29C 45/68 164/312 |
| 7,753,668 B2* | 7/2010 | Glaesener | B29C 45/1744 425/138 |
| 2006/0263471 A1 | 11/2006 | Tsuji | |

FOREIGN PATENT DOCUMENTS

| | | |
|---|---|---|
| DE | 29516559 U1 | 1/1996 |
| DE | 10229060 B4 | 2/2004 |
| DE | 20317114 U | 2/2004 |
| DE | 60214802 T2 | 3/2007 |
| DE | 102008051300 B3 | 1/2010 |
| EP | 0427438 B1 | 12/1998 |
| EP | 1277559 B1 | 9/2006 |
| EP | 2228192 A1 | 9/2010 |
| WO | 2016202509 A1 | 12/2016 |

* cited by examiner

MOLD CLOSING UNIT FOR AN INJECTION MOLDING MACHINE

CROSS REFERENCE TO RELATED APPLICATIONS

The present application refers to and claims the priority of the German patent application 10 2017 117 934.8, filed on Aug. 7, 2017, the disclosure content of which is herein incorporated by reference in its entirety.

TECHNICAL FIELD

The disclosure relates to a mold closing unit for an injection molding machine for processing plastics materials and other plasticizable materials such as ceramic or powdery materials.

In the context of this disclosure, a toothed rack drive should be understood to be a drive which comprises at least one toothed rack and at least one gearwheel or pinion cooperating with the at least one toothed rack, wherein a drive motor drives at least one gearwheel or pinion. In principle thereby, both a motor with, for example, two gearwheels that are connected to a continuous shaft can engage in two toothed racks, and also a plurality of, for example four, motors with each of which a gearwheel driven by the motor is associated can engage, for driving, in two toothed racks.

In the context of this disclosure, a "mold closure" should be understood to be the state of an injection molding machine in which, with an injection mold mounted on the mold mounting plate and received in the mold clamping space, the parts of the injection mold adjoin one another, which with an injection mold present, corresponds to the smallest spacing between the mold mounting plates. In this state, the closing force is usually applied and the plasticized material is injected into the mold cavity of the injection mold.

BACKGROUND

In order to open the mold closing unit of an injection molding machine following an injection molding procedure or to close it before an injection molding procedure, at least one of the mold mounting plates must be moved. In order to keep the dead time of the injection molding machine as short as possible and thus to obtain a sufficient degree of productivity, a rapid opening and closing of the mold closing unit is desirable. Since, however, mold mounting plates have a large weight, depending upon the size of the injection molding machine, they must be moved very carefully and meticulously since otherwise a parallel mold closure of the two mold mounting plates during closure of the mold closing unit is not assured and as a consequence a poor injection molding result and damage to the injection molding machine can occur. Often, the introduction of the closing and opening forces is additionally achieved with diagonally arranged hydraulic cylinders, which results in a restricted access to the mold mounting plate region. Furthermore, due to the large weight of the mold mounting plates, tilting moments of the movable mold mounting plate can arise and this can have the result that the two mold mounting plates do not close parallel, but tilted.

From US 2006/0263471 A1, a mold clamping unit suitable for injection molding machines is known, which comprises a stationary mold clamping plate and a movable mold clamping plate movably arranged on a machine bed. A rack and pinion drive is provided as a drive mechanism for moving the movable mold clamping plate for opening and closing the mold clamping unit. Two racks are fixedly connected to the machine bed for this purpose, the drive motor for the rack drive is fixedly connected to the carriage on which the movable mold clamping platen is arranged, so that when the mold clamping platen moves, the drive motor moves synchronously with the movable mold clamping platen in the same direction.

A clamping unit for an injection molding machine with a movable mold mounting plate and a stationary mold mounting plate is known from DE 203 17 114 U1. The movable mold mounting plate is guided on a guideway. The movable mold mounting plate is moved by a drive. The guideway is designed as a linear guideway which prevents the mold mounting plate from tilting from its vertical position. The drive is located beneath the movable mold mounting plate.

From EP 0 427 438 B1, there is known a drive arrangement for an injection molding machine in which, on at least one of the mold plates, a drive unit in the form of a linear drive unit with at least one motor, at least one gearwheel set driven by the motor and a toothed rack is provided. The toothed rack is driven with the aid of the motor and the gearwheel set, whereby the gearwheels and at least a part of the toothed rack are arranged within a housing.

From WO 2016/202509 A1, there is known a toggle lever closing unit for an injection molding machine. A movable cross-head is in operative connection, by means of a toggle lever, with a movable mold mounting plate. The cross-head is moved with the aid of electrical drives such as a toothed rack drive. Furthermore, in addition to the electrical drives, at least one hydraulic drive is provided which is in operative connection with the cross-head and with which a movement of the cross-head along the machine longitudinal axis is possible, wherein the hydraulic drive comprises a piston-cylinder system. In order to move the movable mold mounting plate, the electrical and/or the hydraulic drive can be used.

An injection molding machine with a bar pulling device is known from EP 2 228 192 A1. The bar pulling device has an electric motor drive, for example, a toothed rack drive which is coupled via a gearing device to at least one pullable bar, so that a movable mold mounting plate is displaceably guided during the mold opening and closing movement.

An injection molding machine comprising an injection unit and a closing unit is disclosed in DE 10 2008 051 300 B3. Therein the injection unit is fixed in place and the closing unit is movable relative to the injection unit. Hereby, the complete closing unit is moved relative to the injection unit, which is advantageous for application cases in which a comparatively large injection unit cooperates with a comparatively small closing unit. Within the closing unit, a movable mold mounting plate is moved cyclically by means of a toothed rack drive in that a driven gearwheel engages in a toothed rack mounted on the movable mold mounting plate.

From DE 102 29 060 B4, there is known a closing device for an injection molding machine, wherein the movable mold half of the injection molding tool (injection mold) is advanced by means of a toothed rack drive to the second, fixed mold half, wherein at a particular spacing between the movable mold half and the fixed mold half, a magnetic field is switched on within the fixed mold half and so attracts a magnet which is mounted within the movable mold half by a magnetic force and thus completely closes the two mold halves. The toothed rack drive comprises a toothed rack mounted on the machine bed and a drive motor for a gearwheel engaging in the toothed rack, said motor being movable with the movable mold half.

From EP 1 277 559 B1, there is known a mold closing unit for a plastics injection molding machine in which threads for threaded nuts are provided on the four force transmitting bars, said threaded nuts being actuated together by means of a belt drive to apply the closing force. In order to transfer the mold halves of the injection mold into and out of mold closure, the threaded nuts are decoupled from the thread so that an axial movement of the movable mold carrier, for example, by means of a toothed rack system (FIGS. 11, 12), is possible. The electric motor driving the gearwheel which cooperates with the toothed rack is fastened to the movable mold carrier. For the decoupling and coupling of the threaded nuts, additional mechanisms, and therefore also actuating times, are necessary.

From DE 295 16 559 U1 there is known an injection molding machine with a motor housing which is accommodated between a plurality of toothed racks and in which motors for a mold closing device are accommodated. The motor housing is moved together with the movable mold carrier in that the motors drive gearwheels which mesh with the toothed racks mounted on the force transmitting elements.

From DE 44 03 079 C1 there is known a mold closing device for an injection molding machine with linear roller bearings for a movable mold carrier. Guideways and the movable mold carrier can be aligned to one another by means of an adjusting device.

In all the prior art solutions, a movable mold mounting plate is moved relative to a stationary mold mounting plate for opening or for closing the mold closing unit. As a rule, mold mounting plates have a large mass which severely loads the drives. As the mold mounting plates move, tilting moments can arise during operation of the injection molding machine, in particular during displacement of the mold mounting plates. As a consequence of the resultant forces, a parallel mold closure and parallel movement of the mold mounting plates during closing/opening of the mold closing unit is not assured.

Furthermore, damage to the mold closing unit, the mold mounting plates, the drive and the entire injection molding machine can result from the tilting moments. This is all the more the case if, in place of the market-typical hydraulic cylinders or spindle systems arranged diagonally and therefore usually symmetrically, drive systems arranged asymmetrically, for example, in the machine frame are used, which ensure easier access to the mold clamping space.

BRIEF SUMMARY

The disclosure is intended to prevent tilting moments occurring and to ensure a reliable operation of the mold closing unit.

The mold closing unit for an injection molding machine for processing plastics and other plasticizable materials such as ceramic and powdery materials comprises at least one machine bed, at least one stationary mold mounting plate and at least one mold mounting plate that is movable relative to the stationary mold mounting plate. The movable mold mounting plate is mounted on a carriage which has guideway shoes and is movable along at least one guideway that is mounted on the machine bed. A drive mechanism for displacing the movable mold mounting plate relative to the stationary mold mounting plate into and out of closure of an injection mold arrangeable in a mold clamping space and, for opening/closing the mold closing unit, has at least one toothed rack drive driven by at least one drive motor, with at least one gearwheel and at least one toothed rack in operative connection with the gearwheel. At least two toothed racks are fixedly connected to the machine bed and the drive motor is fixedly connected to the carriage, which moves during a movement of the movable mold mounting plate, synchronously with the movable mold mounting plate, in the same direction. It is in principle also conceivable that the drive motor is fixedly connected directly to the movable mold mounting plate, and also a fixed connection to the carriage and the movable mold mounting plate. For a symmetrical drive of the movable mold mounting plate, at least two toothed racks are provided so that purely thereby a parallel travel motion of the movable mold mounting plate is achieved. Furthermore, due to the fact that the guideway and the toothed racks are connected to one element, synergy effects arise in respect of stability, which has a positive effect on a parallel closure of the mold mounting plates. By the use of at least two toothed rack drives, it is possible to prevent the tilting moments and the tilting forces associated with them due to an uneven weight distribution of the movable mold mounting plate in relation to the guide elements.

During acceleration and/or braking of the usually heavy mold mounting plates, due to inertia, tilting forces can arise, which can have negative effects on the safety and the closure of the injection molding process. For a reliable movement of the movable mold mounting plate, the carriage has at least one load sensor for detecting tilting forces. It is also conceivable, in principle, that a plurality of load sensors are mounted at different sites of the carriage and/or the movable mold mounting plate, so that the tilting forces are advantageously detected with a greater accuracy over the whole carriage or over the whole movable mold mounting plate. Making use of the forces detected by the at least one load sensor, by means of an intelligent drive motor control, the tilting tendency due to the inertia resulting from the dynamic movement can be counteracted. Since, tilting forces can also arise from an uneven load distribution of the movable mold mounting plate and also from mass inertias as influences of the dynamic movement, the load sensor is connected to at least one regulating unit which regulates the drive mechanism according to the tilting force and so compensates for the tilting forces.

In order to achieve the most unhindered possible access to the mold clamping space as well as an advantageously compact construction and to save space, the drive mechanism is preferably arranged in the plane of the machine bed and thus beneath the support elements and the mold mounting plates. This ensures a free accessibility to the mold clamping space, not only on installation of the injection mold, but also cyclically during the production of articles.

The at least one drive motor is preferably intended and suitable both for moving the movable mold mounting plate and also for opening and closing the mold closing unit. Therefore, for these movements, separate drive units needing to be matched to one another by means of a control unit are not required.

Preferably, on closure of the injection mold, the closing force is applied by means of a separate closing force generating unit which is preferably mounted on the stationary mold mounting plate, decoupled from the at least one drive mechanism. Separate decoupling means for decoupling the movement of different drives can thus be dispensed with.

Preferably, the at least one load sensor is arranged in the support of the force application points and thus preferably under the support elements.

Advantageously for deceleration of the movement and locking of the mold mounting plates, the drive mechanism comprises at least one brake. The brake can also be conceived as merely a stopping and holding brake or as an emergency stop brake.

The drive mechanism preferably comprises two, particularly preferably four, drive motors which, independently of one another, each drive a toothed rack drive or engage independently of one another in a toothed rack drive. By means of the separate driving of the two toothed rack drives, it is advantageously possible to compensate for tilting moments in the case, in particular, of an uneven load distribution of the movable mold mounting plate through targeted driving of the corresponding toothed rack drives. It is also possible, by means of the drives, to influence the mold parallelism of the movable mold mounting plate in relation to the stationary mold mounting plate.

For an advantageously simple construction, the drive mechanism comprises a drive motor which drives a shaft which is in operative connection with two toothed rack drives. By means of the driving of the shaft with the aid of a corresponding actuation of the toothed rack drive, a parallel drive is ensured.

It is advantageous if the toothed racks are arranged beneath the guideway and preferably covered by the guideway for the movable mold mounting plate, since merely with this arrangement, a stabilization of the mold mounting plate takes place during its movement and also during the injection molding process. In a further preferred exemplary embodiment, this arrangement can be utilised by means of additional adjusting means for further securing of the mold mounting plate.

Preferably, the adjusting means for adjusting the movable mold mounting plate is provided on one side on the guideway and, on the other side, on the toothed rack in order to ensure a setting as close as possible to the point of application of force, in order thereby to achieve a play-free adjustment between the guiding system and the drive system.

BRIEF DESCRIPTION OF THE FIGURES

The disclosure will now be described in greater detail by reference to an exemplary embodiment illustrated in the accompanying figures. In the drawings.

DETAILED DESCRIPTION

The disclosure will now be described in greater detail making reference to the accompanying drawings. The exemplary embodiments merely represent examples, however, which are not intended to restrict the inventive concept to a particular arrangement. Before the disclosure is described in detail, it should be noted that it is not restricted to the various components of the device and the various method steps, since these components and methods can vary. The expressions used here are intended merely to describe particular embodiments and are not used restrictively. Furthermore, where the singular or the indefinite article is used in the description or the claims, it also relates to a plurality of these elements, provided the overall context does not clearly reveal otherwise.

Figure 1:
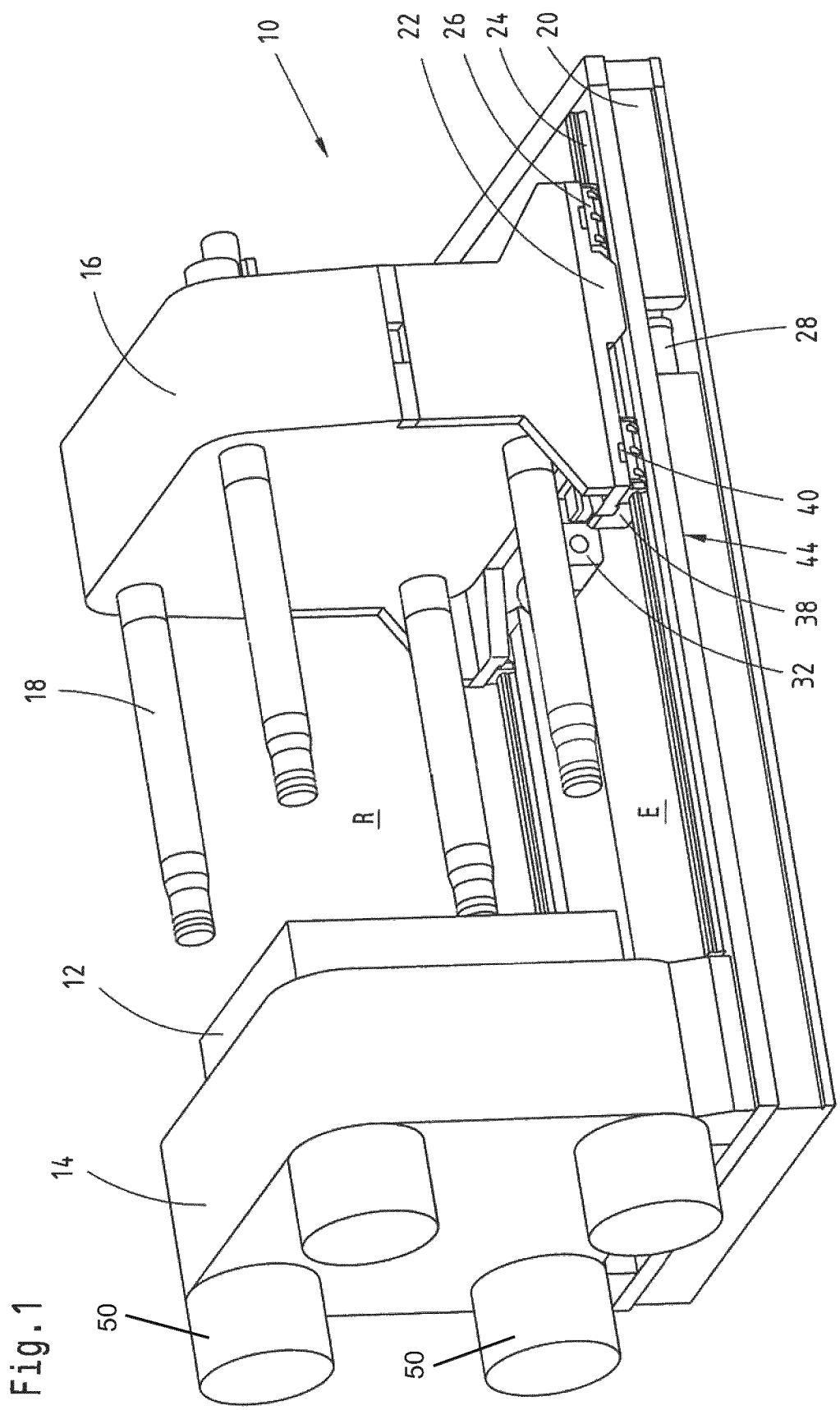
FIG. 1 shows an isometric view of the mold closing unit according to the disclosure in the opened state from obliquely above.

FIG. 1 shows schematically a perspective view of a mold closing unit 10 from obliquely above for an injection molding machine for processing plastics and other plasticizable materials such as ceramic or powdery materials, comprising a stationary mold mounting plate 14, a movable mold mounting plate 16 which, together with the stationary mold mounting plate 14, defines a mold clamping space R for receiving changeable injection molds 12, as shown partially in FIG. 1.

The movable mold mounting plate 16 is mounted on a carriage 22 with guideway shoes 26 and is movable, along at least one guideway 24 mounted on the machine bed 20, relative to the stationary mold mounting plate 14 into and out of closure of an injection mold 12 arranged in the mold clamping space R. Bars 18 engage through the movable mold mounting plate 16 and, in the closed state, lock the mold closing unit 10 or the stationary mold mounting plate 14 to the movable mold mounting plate 16. In order to move the movable mold mounting plate 16 and for opening/closing the mold closing unit 10, the mold closing unit 10 has at least one drive mechanism 44. The drive mechanism 44 comprises at least one toothed rack drive 38 driven by at least one drive motor 32 with at least one gearwheel 36 and at least one toothed rack 34 cooperating with the gearwheel according to FIG. 4.

Figure 2:
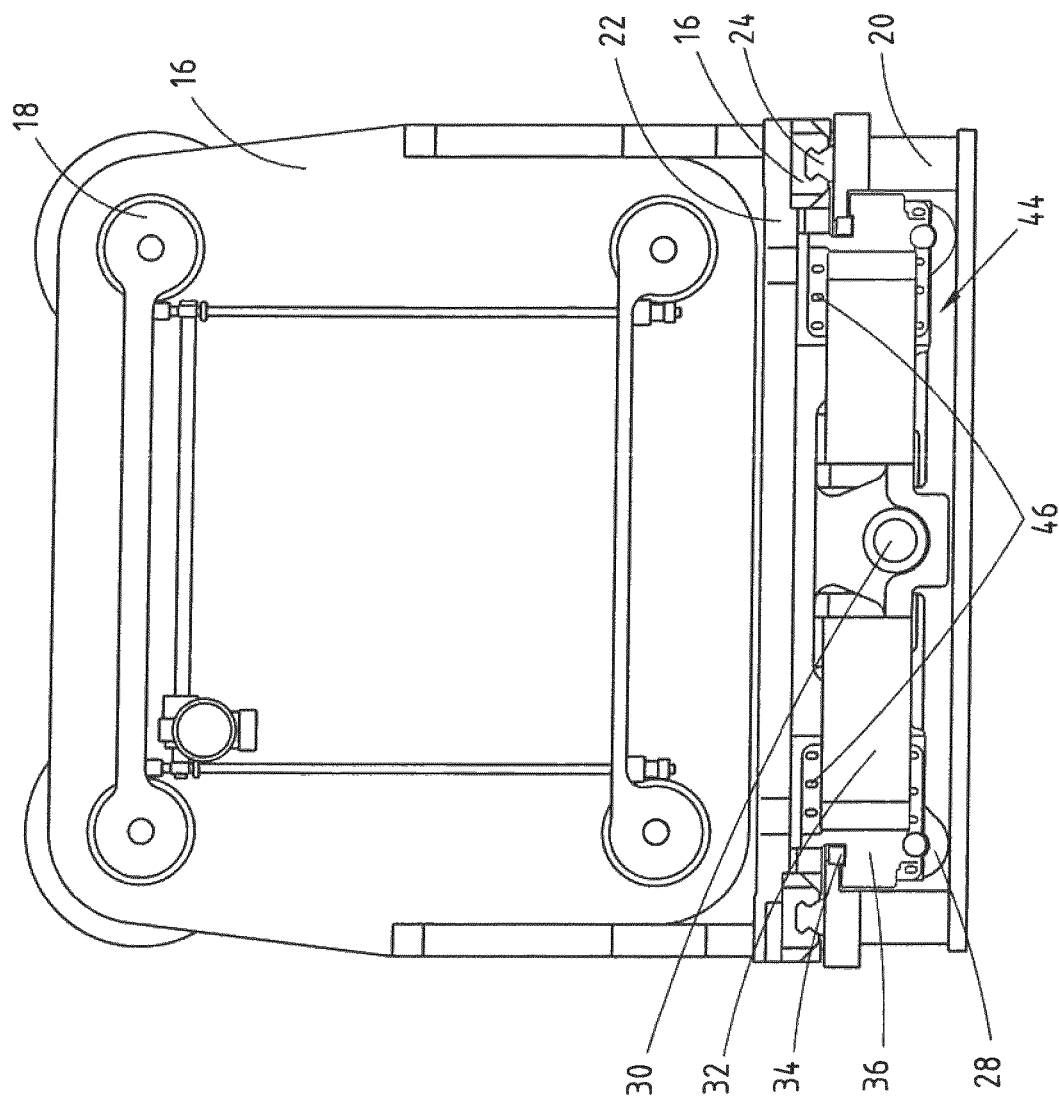
FIG. 2 shows a rear view of the mold closing unit according to FIG. 1, FIGS. 3a-3c show side views of the mold closing unit according to FIG. 1 in different exemplary embodiments with different drive concepts.

According to the rear view of the mold closing unit in FIG. 2, at least two toothed racks 34 are firmly connected to the machine bed 20. The drive motor 32 is firmly connected to the carriage 22. On actuation of the drive mechanism 44, the drive motor 32 rotates the gearwheel 36 which engages into the toothed rack 34 and thereby moves the carriage 22. During a movement of the movable mold mounting plate 16, the drive motor 32 moves synchronously with the movable mold mounting plate 16, in the same direction. The drive motor 32 moves together with the movable mold mounting plate 16. Preferably, an even number of toothed racks 34 is provided.

Advantageously, the drive mechanism 44 is arranged in the plane E of the machine bed 20 and preferably beneath the support elements for the mold mounting plates, so that free access to the mold clamping space R is provided. Thereby, the toothed racks 34 are preferably mounted on the machine bed 20 in suspended manner and located internally and thereby protected against dirt.

In principle, however, another arrangement of the drive mechanism 44, for example, laterally to or above the mold mounting plates 14, 16 is also conceivable. The toothed rack 34 could then be supported, for example, on the stationary mold mounting plate 14.

The at least one drive motor 32 is preferably intended and suitable both for moving the movable mold mounting plate 16 and also for opening and closing the mold closing unit 10. Separate drives are not needed for these movement processes.

The closing force to be applied during closure of the injection mold 12 and during injection of the plasticizable material into the mold cavity is preferably applied by means of a separate closing force generating unit 50 which is preferably mounted on the stationary mold mounting plate 14 or on another stationary element of the machine, for example, a support plate for the mold closing unit. As a result, a separate decoupling of the mold travel movement and the closing force application is not needed. The element for the application of the closing force can thus be actuated directly at any time and without delay, which reduces the cycle time of the cyclically operating injection molding machine.

FIG. 2 also shows that the toothed racks 34 are arranged beneath the guideway 24 and preferably covered by the guideway 24 for the movable mold mounting plate 16. For further stabilization, adjusting means 46 can be formed in the exemplary embodiment by a slotted adjustment of the motor/pinion combination for adjusting the movable mold mounting plate 16 on the guideway 24 on the one side and, on the other side, on the toothed rack 34, in order thereby to achieve a play-free adjustment between the guiding system and the drive system.

Figure 3A:
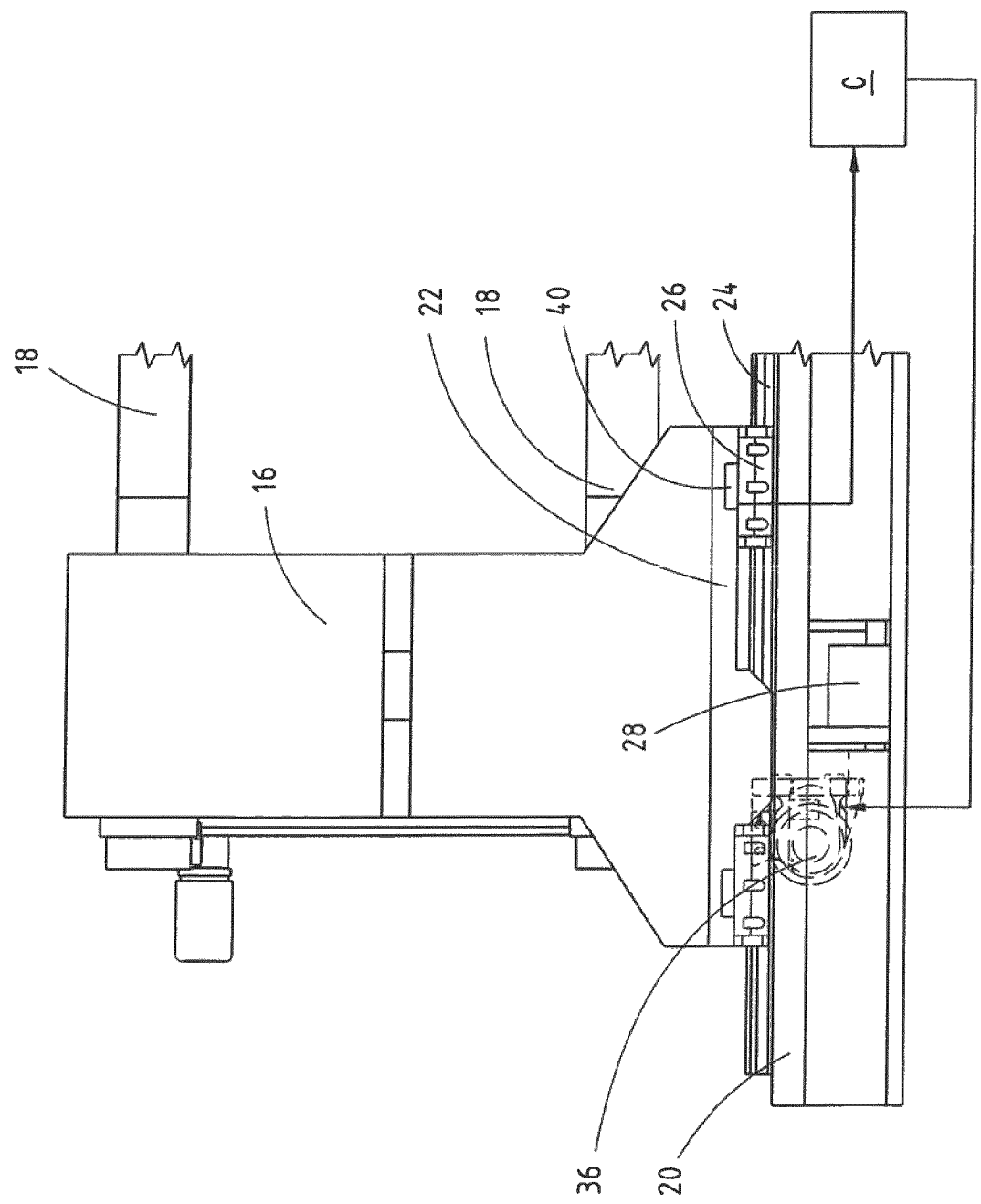

In a further exemplary embodiment according to FIG. 3a, load sensors 40 are mounted on the carriage 22. In principle, the load sensors 40 being mounted directly on the movable mold mounting plate 16 is also conceivable, as is a mounting of the load sensors 40 on the carriage 22 and the movable mold mounting plate 16. With the aid of the load sensors 40, tilting forces affecting the movable mold mounting plate 16 are detected. The tilting forces can lead to an inclination of the movable mold mounting plate 16 in and/or against the movement direction not only, but also due to an uneven load distribution during the movement, in particular during the acceleration of the movable mold mounting plate 16.

Given knowledge of the load distribution, the tilting forces are preferably be compensated for with a regulating unit C. For this purpose, the load sensors 40 are connected to the at least one regulating unit C which regulates the drive mechanism 44 according to the tilting forces present so that a tilt-free movement of the movable mold mounting plate 16 and, as far as possible, a plane-parallel movement of the mold mounting plates relative to one another can be assured. With the aid of the load sensors 40, tilting forces occurring during operation of the injection molding machine or of the movable mold mounting plate 16 can be detected. The regulating unit C subsequently regulates the drive mechanism 44 according to the detected tilting forces so that the tilting forces are compensated for by acceleration or braking of the movable mold mounting plate 16. For example, in the presence of a tilting force in the movement direction of the movable mold mounting plate 16 the regulating unit C can briefly increase the speed of the gearwheel drives 38 by means of the drive mechanism 44, in order to intercept and compensate for a "tilting" of the movable mold mounting plate 16.

If four drives are provided, the movable mold mounting plate 16 can be displaced or moved in a restrained manner, i.e. it is determined by its degrees of freedom.

Figure 3B:
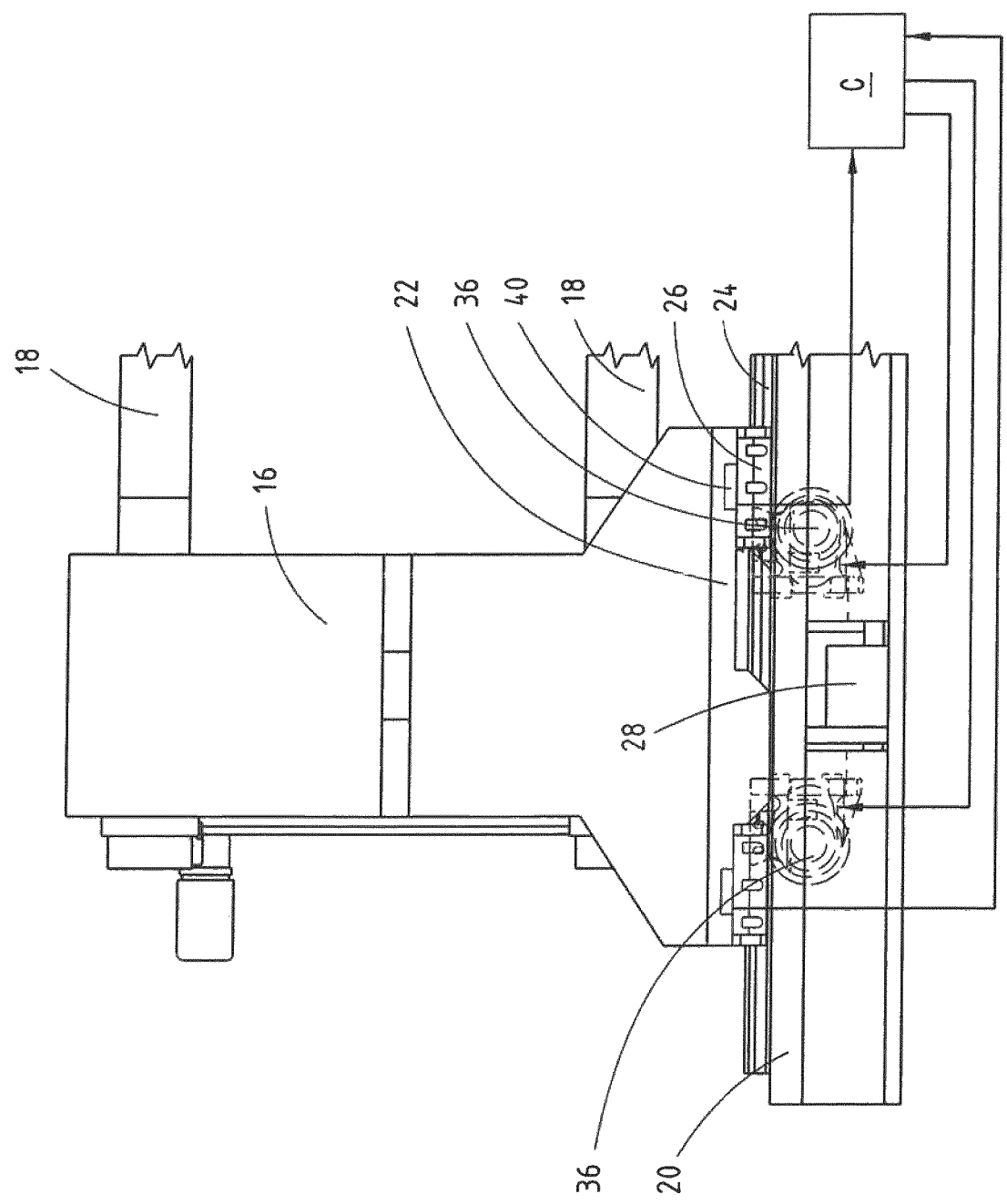
Figure 3C:
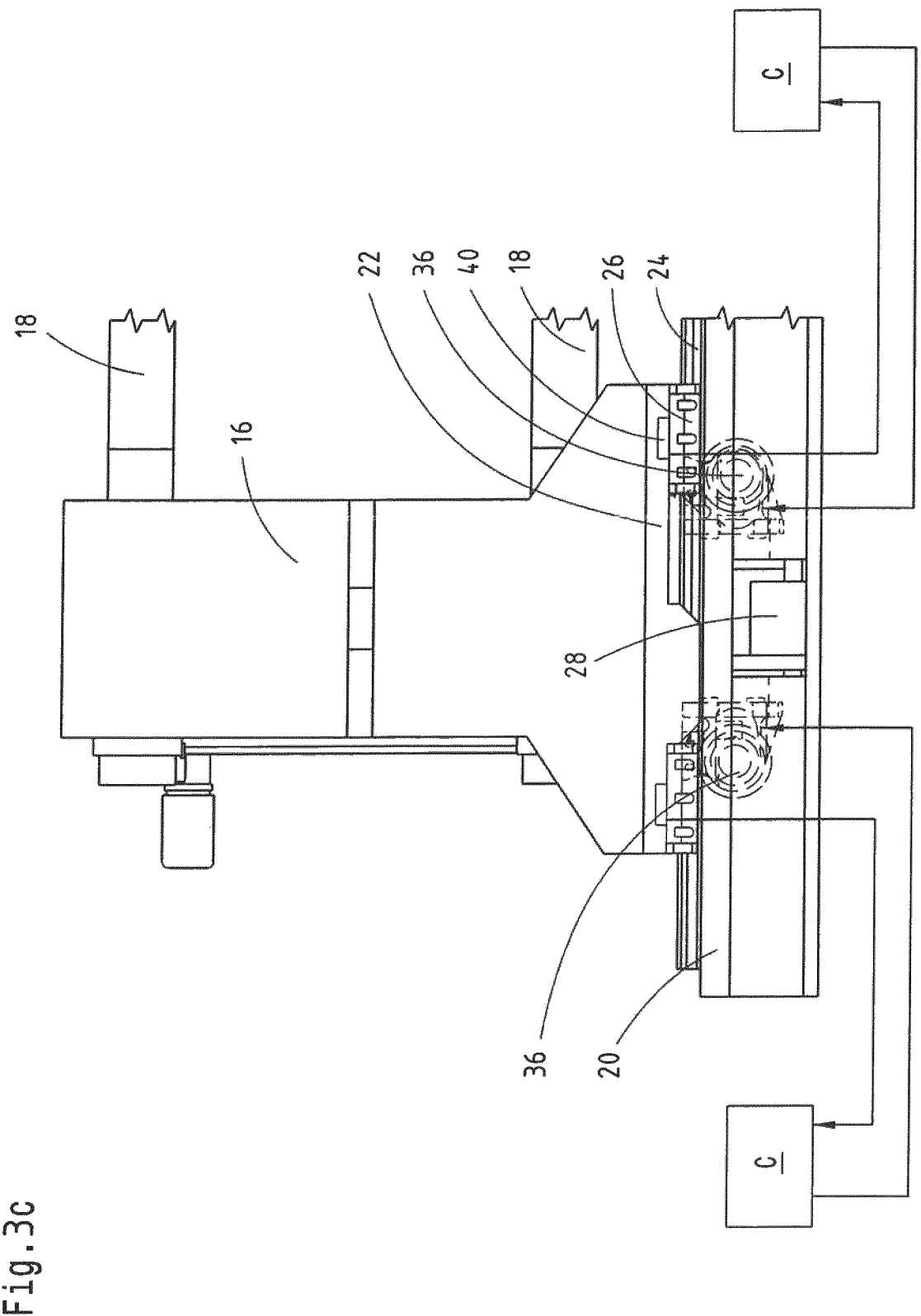

FIGS. 3b and 3c show alternative drive concepts. Whilst in FIG. 3b, a plurality of drives are regulated by a regulating unit C, FIG. 3c shows a solution in which each drive is regulated by a separate regulating unit C. This therefore involves an independent control system and the regulating units can communicate with one another for stabilising the mold mounting plate 16.

Figure 4:
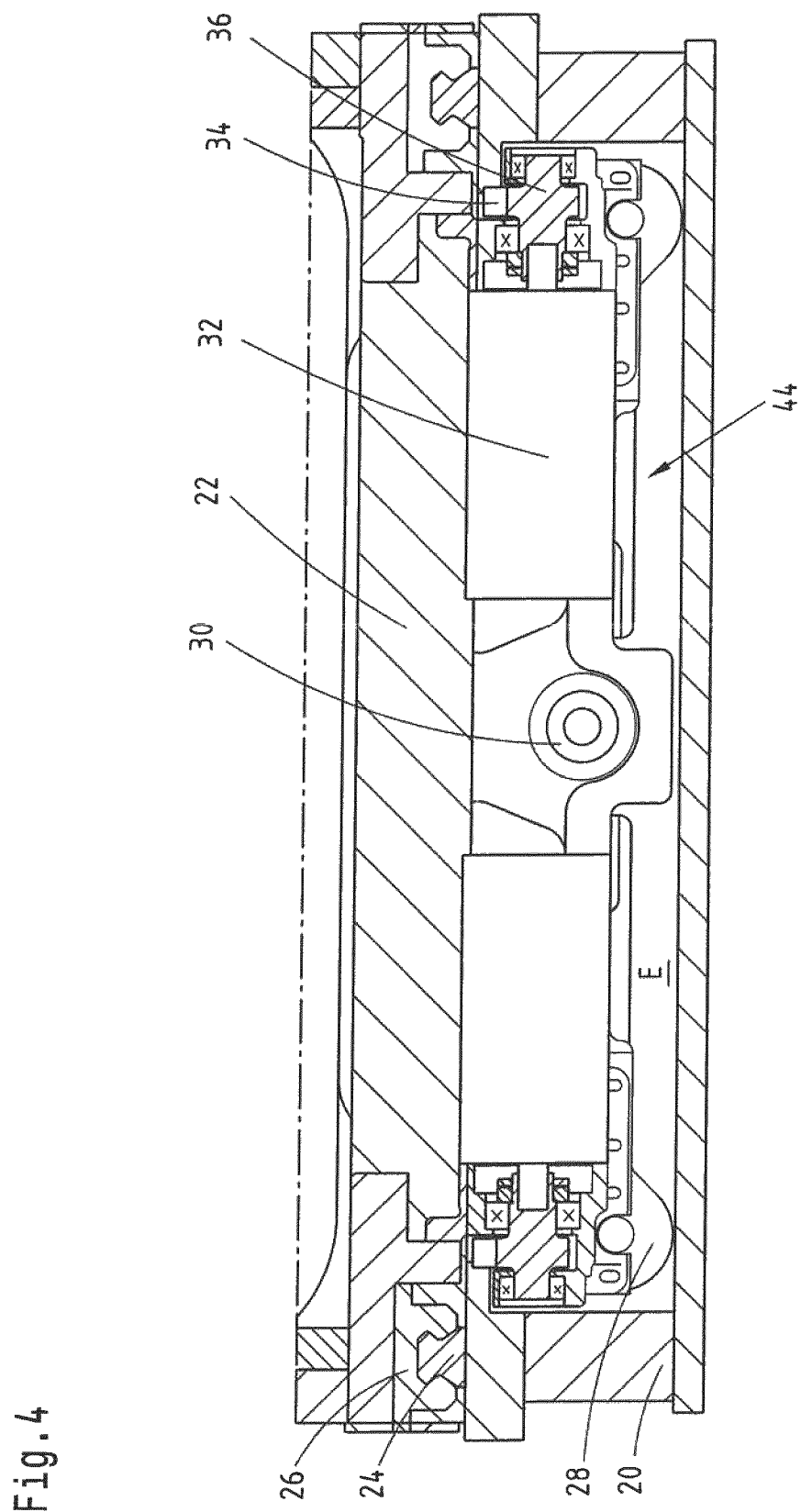
FIG. 4 shows a sectional view of the drive mechanism in the region of the machine bed with two drive motors, along the line B-B in FIG. 3a, FIG. 5a shows a rear view of the mold closing unit with a drive motor and a shaft.

FIG. 4 shows a sectional view of the drive mechanism 44 in the region of the machine bed 20 along the sectional plane B-B shown in FIG. 3a. In order to decelerate the movable mold mounting plate 16, the drive mechanism 44 comprises at least one brake, preferably as a stopping brake or an emergency stop brake. In FIG. 4, the drive mechanism 44 preferably comprises a brake 30 which is mounted centrally between the drive motors 32. Alternatively or additionally, a further brake 28 can be provided. All the brakes can be configured as frictional brakes or as locking brakes, dependent upon their location and configuration. The brakes 30 and 28 assume, in principle, the same function (emergency stop or stopping brake), wherein merely alternative positions have been shown. Also conceivable, for example, is a hydraulic brake. Provided to the left and the right beside the drive motors 32, alternatively or in addition to the brake 30 is a further brake 28, each of which is associated with a toothed rack drive 38. Furthermore, the brakes 28, 30 can secure the toothed rack drives 38 so that the movable mold mounting plate 16 can no longer be moved. In the exemplary embodiment, at least one or a combination of up to six brakes can be implemented (a maximum of 2 brakes in the middle (position 30) and one each at right and left (position 28) and/or two brakes at each of right and left (position 28).

In FIGS. 3a and 4, the drive mechanism 44 comprises two drive motors 32, each being associated with a toothed rack drive 38. The drive motors 32 are preferably arranged to left and right of the brake 30 and drive respective gearwheels 36 which engage in the toothed racks 34 and so move the carriage 22. The drive motors 32 can drive the toothed rack drives 38 synchronously or can also operate independently of one another. For example, it is possible during a tilting of the movable mold mounting plate 16, to actuate both drive motors 32 simultaneously synchronously in their movement direction in order thus to compensate for the tilting. Furthermore, in the case of a lateral right-left tilting of the movable mold mounting plate 16, it is possible to actuate the right and/or left toothed rack drive 38 and so to restore the parallelism of the movable mold mounting plate 16 in relation to the stationary mold mounting plate 14.

Figure 5A:
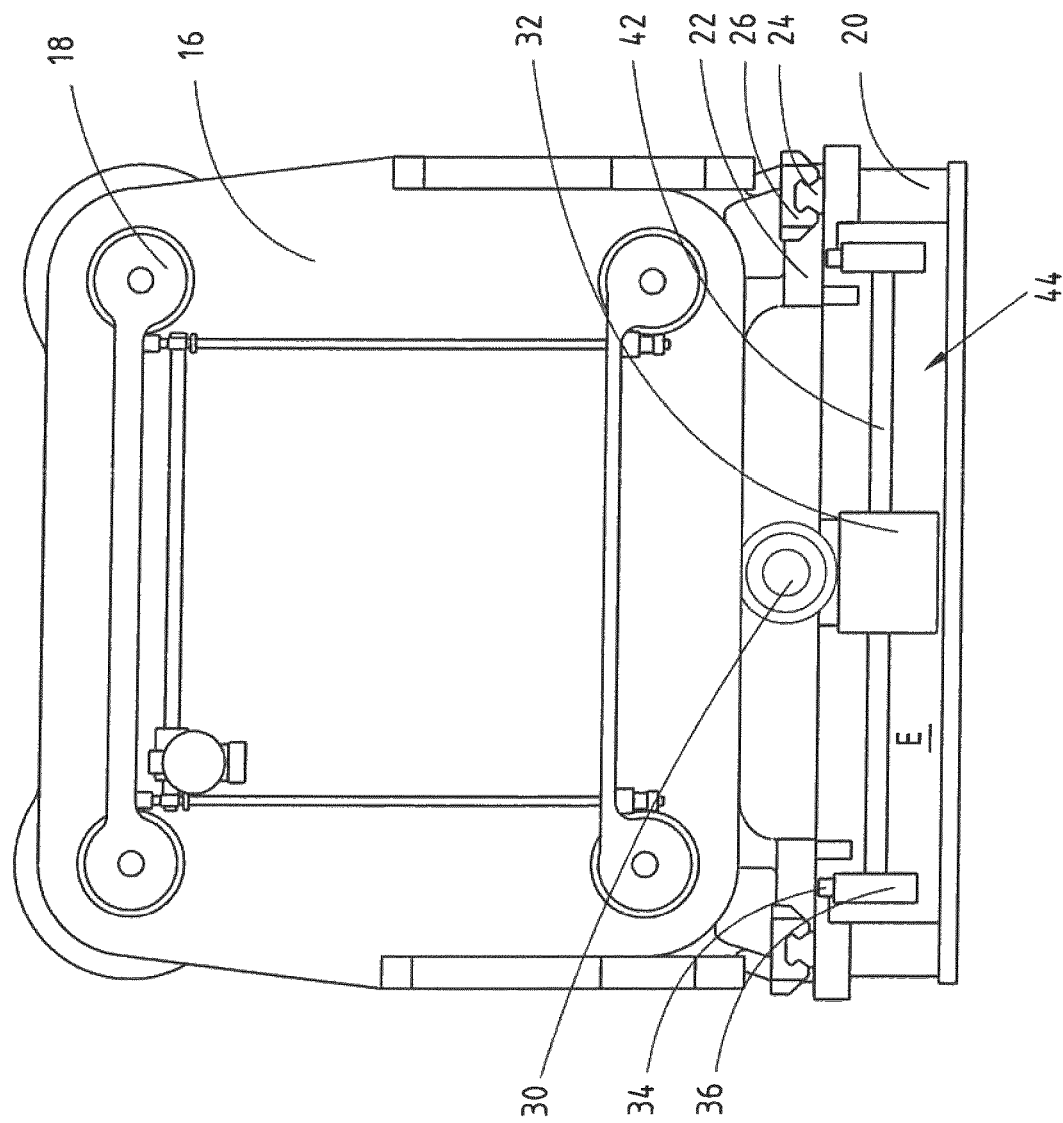
FIG. 5b shows a rear view according to FIG. 5a in a further exemplary embodiment with a double drive having a continuous shaft.

In a further preferred exemplary embodiment according to FIG. 5a, the drive mechanism 44 comprises a drive motor 32 which drives the two toothed rack drives 38 by means of a shaft 42 via the gearwheels 36. By this means, a parallel driving of the movable mold mounting plate 16 is ensured. FIG. 5a also shows a centrally arranged brake 30.

Figure 5B:
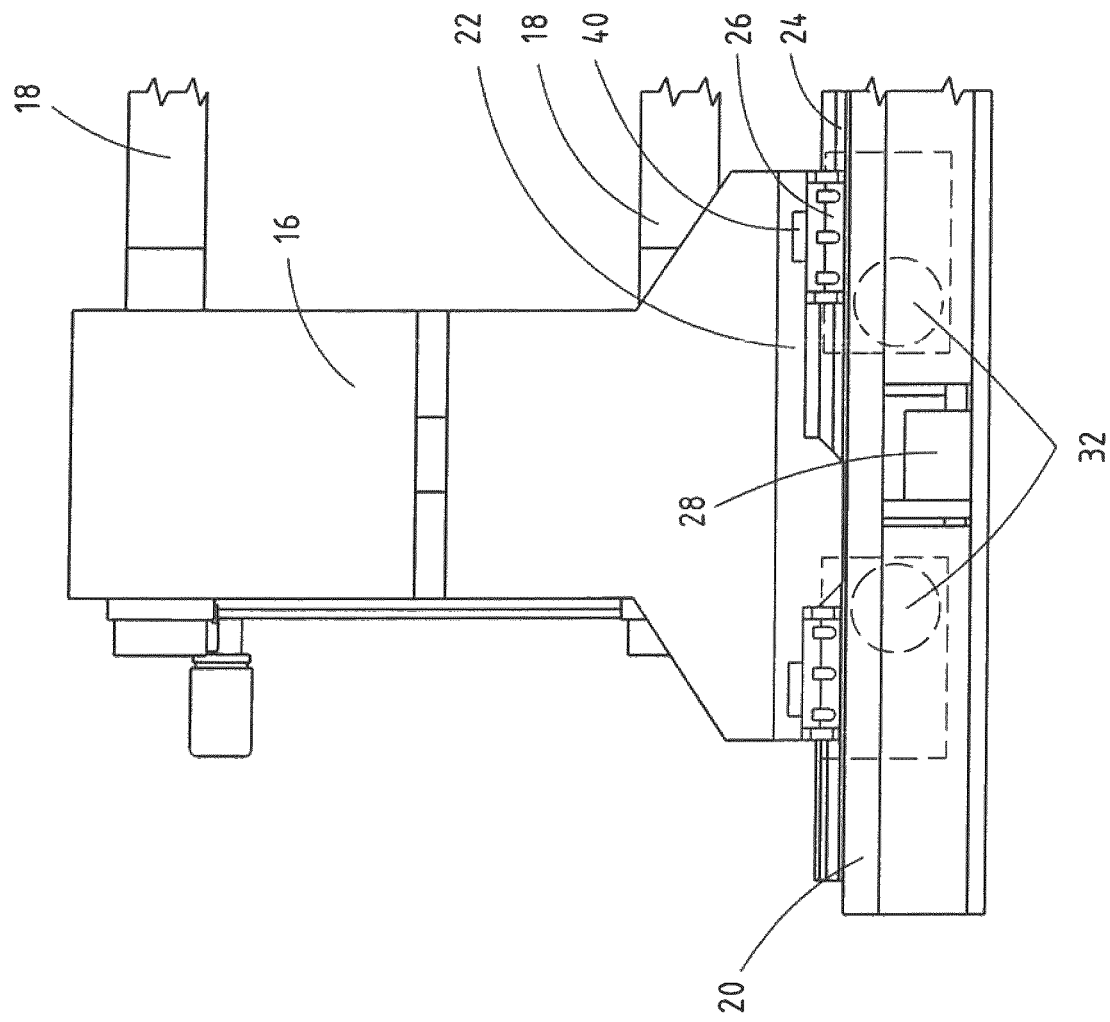

During a tilting of the movable mold mounting plate 16 in the movement direction of the movable mold mounting plate 16, it is possible, by actuating the toothed rack drive 38, to compensate for the tilting and to bring the movable mold mounting plate 16 into parallelism with the stationary mold mounting plate 14. For this purpose, a double drive 32 is provided in FIG. 5b with a continuous shaft 42 for driving two gearwheels 36.

In principle thereby, a motor with, for example, two gearwheels 36 that are connected to a continuous shaft 42 can engage in two toothed racks (FIG. 5a). This is also possible with a plurality of motors according to FIG. 5b. Similarly, according to FIGS. 3b and 3c, a plurality of, for example four, motors with each of which a gearwheel driven by the motor is associated can engage, for driving, in two toothed racks.

It is self-evident that this description can be subject to a great variety of modifications, amendments and adaptations, which belong within the scope of equivalents to the accompanying claims.

The invention claimed is:

1. Mold closing unit for an injection molding machine for processing plastics materials and other plasticizable materials such as ceramics and powdered materials, comprising at least one machine bed, at least one stationary mold mounting plate arranged on the machine bed, at least one movable mold mounting plate arranged on the at least one machine bed movable relative to the at least one stationary mold mounting plate, wherein the at least one movable mold mounting plate is movable on a carriage with guideway shoes along at least one guideway that is mounted on the at least one machine bed with the at least one stationary mold mounting plate into and out of closure of an injection mold arrangeable in a mold clamping space, at least one drive mechanism for moving the at least one movable mold mounting plate and for opening/closing the mold closing unit, wherein the at least one drive mechanism has at least one toothed rack drive driven by at least one drive motor with at least one gearwheel and at least one toothed rack cooperating therewith, wherein at least two toothed racks are fixedly connected to the at least one machine bed and wherein the at least one drive motor is fixedly connected to the carriage and during a movement of the at least one movable mold mounting plate moves synchronously with the at least one movable mold mounting plate in the same direction, wherein the carriage comprises at least one load sensor for detecting tilting forces, the at least one load sensor being connected to at least one regulating unit, which is adapted to regulate the at least one drive mechanism according to the tilting force.

2. Mold closing unit according to claim 1, wherein the at least one drive mechanism is arranged in a plane of the machine bed.

3. Mold closing unit according to claim 1, wherein the at least one drive motor is intended and suitable both for moving the at least one movable mold mounting plate and also for opening and closing the mold closing unit.

4. Mold closing unit according to claim 1, wherein, for applying the closing force on closure of the injection mold, there is provided a closing force generating unit, decoupled from the at least one drive mechanism.

5. Mold closing unit according to claim 4, wherein the closing force generating unit is mounted on the at least one stationary mold mounting plate.

6. Mold closing unit according to claim 1, wherein the at least one load sensor is arranged in a support of force application points of the at least one movable mold mounting plate on the carriage.

7. Mold closing unit according to claim 1, wherein the at least one drive mechanism comprises at least one brake.

8. Mold closing unit according to claim 1, wherein the at least one drive mechanism comprises at least two drive motors which engage independently of one another in the at least one toothed rack drive.

9. Mold closing unit according to claim 1, wherein the at least one drive mechanism comprises four drive motors which engage independently of one another in the at least one toothed rack drive.

10. Mold closing unit according to claim 1, wherein the at least one drive motor drives at least one shaft, which is in operative connection with at least two toothed rack drives.

11. Mold closing unit according to claim 1, wherein the toothed racks are arranged beneath the guideway for the at least one movable mold mounting plate.

12. Mold closing unit according to claim 11, wherein the toothed racks are covered by the guideway for the at least one movable mold mounting plate.

13. Mold closing unit according to claim 1, wherein adjusting means are provided for adjusting the at least one movable mold mounting plate on the guideway and on the at least one toothed rack.

\* \* \* \* \*